(12) United States Patent
Kang et al.

(10) Patent No.: US 8,663,844 B2
(45) Date of Patent: Mar. 4, 2014

(54) RECHARGEABLE ZINC ION BATTERY

(75) Inventors: Feiyu Kang, Guangdong (CN); Chengjun Xu, Guangdong (CN); Baohua Li, Guangdong (CN); Hongda Du, Guangdong (CN)

(73) Assignee: Graduate School at Shenzhen, Tsinghua University, Shenzhen (CN)

( * ) Notice: Subject to any disclaimer, the term of this patent is extended or adjusted under 35 U.S.C. 154(b) by 191 days.

(21) Appl. No.: 13/274,829

(22) Filed: Oct. 17, 2011

(65) Prior Publication Data

US 2012/0034515 A1 Feb. 9, 2012

Related U.S. Application Data

(63) Continuation of application No. PCT/CN2009/072312, filed on Jun. 17, 2009.

(30) Foreign Application Priority Data

Apr. 15, 2009 (CN) .......................... 2009 1 0106650

(51) Int. Cl.
*H01M 6/04* (2006.01)
*H01M 4/42* (2006.01)
*H01M 4/505* (2010.01)

(52) U.S. Cl.
USPC ............................ 429/229; 429/188; 429/224

(58) Field of Classification Search
USPC ........................................................ 429/229
See application file for complete search history.

(56) References Cited

U.S. PATENT DOCUMENTS

| 4,091,178 | A | | 5/1978 | Kordesch |
| 4,119,770 | A | * | 10/1978 | Land ............................ 429/152 |
| 5,952,124 | A | * | 9/1999 | Kainthla et al. ............... 429/224 |
| 6,017,390 | A | * | 1/2000 | Charych et al. ................. 117/68 |
| 6,187,475 | B1 | * | 2/2001 | Oh et al. ........................ 429/205 |
| 2003/0068549 | A1 | * | 4/2003 | Daniel-Ivad et al. ......... 429/212 |

FOREIGN PATENT DOCUMENTS

| CA | 2389907 | 12/2003 |
| CN | 1083974 | 3/1994 |
| CN | 1238569 | 12/1999 |
| CN | 1260603 | 7/2000 |
| CN | 101317287 | 12/2008 |

OTHER PUBLICATIONS

Chen Lai-mao and Chen Yong-xin, "Summary of the development of alkaline Zn—$MnO_2$ batteries," Chinese Battery Industry, vol. 11, No. 2 (Apr. 2006), p. 119-124 (abstract and partial translation provided).

(Continued)

*Primary Examiner* — Ula C Ruddock
*Assistant Examiner* — Matthew Van Oudenaren
(74) *Attorney, Agent, or Firm* — Hamre, Schumann, Mueller & Larson, P.C.

(57) ABSTRACT

The present disclosure describes a rechargeable zinc ion battery, in which anodic zinc will be electrochemically dissolved as $Zn^{2+}$ ions, diffuses to the cathodic electrode/electrolyte interface through the electrolyte, and zinc ions are subsequently intercalated into manganese dioxide during discharging. In charging, above-mentioned process will be reversed. The rechargeable zinc ion battery comprises a cathode formed from a compressed mixture of alpha manganese dioxide particles, electrically conductive particles and one or more binder(s); a zinc anode separated from cathode; an aqueous electrolyte contains zinc ions in which the pH value may be controlled between 4 and 7.

4 Claims, 8 Drawing Sheets

(56) References Cited

OTHER PUBLICATIONS

Yuwei Shen and Karl Kordesch, "The mechanism of capacity fade of rechargeable alkaline manganese dioxide zinc cells," Journal of Power Sources, vol. 87 (2000), p. 162-166.

Xia Xi, "Past, present, and future of $MnO_2$ batteries," Chinese Journal of Power Sources, vol. 20, No. 2 (Apr. 1996), p. 78-81 (abstract and partial translation provided).

Xia Xi and Li Qingwen, "The Rechargeability of Manganese Dioxide Electrode (I)," Battery Bimonthly, vol. 22, No. 4 (Aug. 1992), p. 177-180 (abstract and partial translation provided).

International Search Report for international application No. PCT/CN2009/072312, dated Jan. 21, 2010 (5 pages).

Written Opinion of the International Searching Authority for international application No. PCT/CN2009/072312, dated Jan. 21, 2010 (5 pages).

* cited by examiner

RECHARGEABLE ZINC ION BATTERY

BACKGROUND

This invention relates to rechargeable zinc ion batteries.

Due to the fast pace of expansion of human activity and exhaustion of fuel oil, high energy density electrochemically rechargeable energy storage systems are the key to the future realization of a myriad of next generation applications ranging from biomedical to electric vehicles. The single-ion battery is one of the most widely used rechargeable systems. It utilizes at least one intercalation electrode with the guest cations, univalent or bivalent cations, as the charge storage medium. Two single-ion battery technologies, for example, nickel metal hybrids (NiMeH) and lithium ion, have been commercialized for mass applications. NiMeH batteries utilize the reversible intercalation of a $H^+$ guest cation into NiOOH and alloying reactions with rare earth electrodes. The rocking chair Li-ion battery utilizes intercalation reactions of $Li^+$ ions into oxides positive electrodes or carbon-based negative electrodes. It is certain that it is significantly important to invent new single ion batteries from scientific and industrial points of view.

The fundamentals of manganese dioxide chemistry for energy storage continue to be of widespread interest. Since 1865, zinc-manganese dioxide battery chemistry has been proposed and a kind of primary zinc-manganese dioxide battery has been built up. This primary battery contains $\gamma\text{-}MnO_2$ cathode and a zinc anode using zinc chloride and ammonium chloride solutions as the electrolyte.

The discharge process of positive $\gamma\text{-}MnO_2$ cathode in such cells is based on two electron steps. The first electron process is described as follow:

$$MnO_2 + NH_4^+ + e^- \rightarrow MnOOH + NH_3 \uparrow \quad (1)$$

or $$MnO_2 + H^+ + e^- \rightarrow MnOOH \quad (2)$$

If the electrode continues to discharge, MnOOH is further reduced at the second step:

$$MnOOH + H^+ + e^- \rightarrow MnO_2 + Mn^{2+} + 2H_2O \quad (3)$$

During the two electron steps of positive $\gamma\text{-}MnO_2$ cathode, anodic zinc will be electrochemically dissolved.

In the middle of $20^{th}$ century, an alkaline manganese dioxide-zinc battery has been built up based on alkaline electrolytes. The first electron process of positive $\gamma\text{-}MnO_2$ cathode in such alkaline cells is following:

$$MnO_2 + H_2O + e^- \rightarrow MnOOH + OH^- \quad (4)$$

In the second electron process, the reaction is:

$$MnOOH + H_2O \rightarrow Mn(OH)_2 + OH^- \quad (5)$$

At the same process, the chemical reaction on zinc anode is:

$$Zn + 4OH^- \rightarrow Zn[(OH)_4]^{2-} + 2e \quad (6)$$

In such alkaline batteries, the electrolyte is not consumed during discharge, which increases the energy storage capacity. Additionally, the high alkaline conductivity can improve battery performance in the high-power domain. Capacity, cost, power, and safety factors have led to the annual global use of approximately 60 billions alkaline manganese dioxide-zinc batteries [Besenhard, J. O., Handbook of Battery Materials Wiley-VCH, 1999].

In 1977, Kordesch had firstly developed the rechargeable alkaline manganese dioxide zinc (RAM) batteries, in which the discharge of positive $MnO_2$ was limited to a depth of one electron per mole of $MnO_2$ by controlling the anode mass. The total reaction of the cell could be expressed as below:

$$2MnO_2 + Zn + H_2O \leftrightarrows 2MnOOH + Zn(OH)_2 \quad (7)$$

Although this rechargeable alkaline manganese dioxide zinc battery needs more procedures or special components than do the primary $Zn/MnO_2$ batteries resulting in the enhancement of the cost as well as sacrificing the capacity, however, the RAM batteries still share more than half of the alkaline battery market due to its recharge ability in USA.

Unfortunately, some critical issues of these RAM batteries limit it to be used in a broader scope. Firstly, they tend to exhibit a sharp decline in discharge capacity with cycling, and reducing the amount of zinc available in the cell only accelerates this situation. Secondly, the coulombic efficiency of such cells is relatively slow. And it also generally acknowledged that it is difficult to industrialize such batteries capable of high-rate charging or discharging [Shen Y. & Kordesch K., The mechanism of capacity fade of rechargeable alkaline manganese dioxide zinc cells. *J Power Sources* 2000, 87, 162]. As the quantity and variety of the electric devices blossomed in recent years or will be in the future, it is always desired to develop new batteries with the improved performance in terms of power, capacity, coulombic efficiency, cycle life as well as cost to meet the continuous-enhanced demands.

SUMMARY

The structural frameworks of manganese dioxides consist of $MnO_6$ octahedra subunits sharing vertices and edges to form endless chains, which can in turn be linked to neighboring octahedral chains by sharing corners or edges. The piling up of $MnO_6$ units enables the building of 1D, 2D or 3D tunnels. The different structures could be described by the size of their tunnel determined by the number of octahedral subunits T(n×m). Typically, and in nature, these tunnels of manganese dioxides can be filled with foreign cations, usually univalent or bivalent cations, or water molecular. There are many types of manganese dioxides containing various univalent and bivalent cations in its tunnels occurring in minerals. The foreign cations locate in the tunnels of manganese dioxides and correspondingly the $Mn^{4+}$ ions will become $Mn^{3+}$ ion to balance the charge.

Based on the unique structure of manganese dioxides, we proposed a new concept about the polyvalent cation intercalation process and found that zinc ions could insert/extract into/from alpha manganese dioxide ($\alpha\text{-}MnO_2$) in an aqueous solution:

$$\delta Zn^{2+} + 2\delta e^- + \alpha\text{-}MnO_2 = Zn_\delta MnO_2 \quad (8)$$

On the other hand, we also found that zinc can be electrochemically deposited and reversibly dissolved as $Zn^{2+}$ ion in the mild aqueous or low acid solutions:

$$Zn = Zn^{2+} + 2e^- \quad (9)$$

Based on the equations (8) and (9), a new rechargeable zinc ion battery is proposed. In discharging, anodic zinc will be electrochemically dissolved as $Zn^{2+}$ ions, which diffuses to the cathodic electrode/electrolyte interface through the electrolyte, and zinc ions subsequently intercalate into alpha manganese dioxide. This process will be reverse when charging. Therefore, this battery could be seen as "rocking-chair" battery.

The rechargeable zinc ion battery comprises a cathode, a zinc anode, a separator for separating said cathode from said anode, and an aqueous mild electrolyte containing zinc ions, in which pH value is controlled from 4 to 7.

The said cathode is normally composed of a compressed mixture of alpha manganese dioxide particles, which can store and release zinc ions ($Zn^{2+}$ ions), electrically conductive particles and one or more binder(s), and this compressed mixture is normally attached by the used binder on a current collector.

The said zinc anode is in any shapes of pure zinc or zinc alloy, such as the foil, film, plat, grid, pillar, etc.

The said zinc anode can also be a compressed mixture of pure zinc and/or zinc alloy particles, electrically conductive particles and one or more binder(s), and this compressed mixture is normally attached by the used binder on a current collector.

The one or more of said binder(s) is selected from the group consisting of natural and synthetic rubbers, polysulfone, acrylic polymers, epoxy resins, polystyrene and polytetrafluoroethylene.

The said cathodic manganese dioxide can host and release zinc ions in its structure lattice, and its capacity of storing zinc ions.

The said aqueous electrolyte comprises a solvent and a solute. The said solvent is water. The said solute could be zinc nitride, zinc chloride, and/or zinc sulfate, etc. The pH value of the said electrolyte can be adjusted from 4 to 7.

The said separator is a thin layer of a suitable material, which can physically separate the said anode from the cathode. This separator is nonoxidizable and stable in the cell environment.

The said rechargeable zinc ion battery can be configured as "button" cell, cylindrical cell or rectangular cell, etc.

DETAILED DESCRIPTION OF THE PREFERRED EMBODIMENTS

Compositions of matter, articles of manufacture and methods for manufacture are set forth herein for preparation of manganese dioxide, battery electrodes, and the rechargeable zinc ion battery.

$MnO_2$ sample was prepared by a self-reacting microemulsion method. 13.32 g surfactant of sodium bis(2-ethylhexyl) sulfosuccinate (AOT) was added in 300 mL iso-octane and stirred well to get an AOT/iso-octane solution. Then 32.4 mL of 0.1 mol $L^{-1}$ $KMnO_4$ aqueous solution was added and this solution was dispersed by ultrasound for 30 min to prepare a dark brown precipitate. The product was separated, washed copiously several times with distilled water and ethanol, and dried at 80° C. for 12 h. This sample is named as amorphous alpha $MnO_2$ (amorphous α-$MnO_2$).

Cathodic electrodes were prepared by mixing 70 wt % of amorphous α-$MnO_2$ powder as active material with 20 wt % acetylene black and 10 wt % polytetrafluoroethylene (PTFE). 70 mg of amorphous α-$MnO_2$ powder and 20 mg of acetylene black were first mixed and dispersed in ethanol by ultrasound for 30 min. Then the ink was dried at 80° C. for 4 h to get dark mixed powder and 10 mg of PTFE was added to get a paste. Then the paste was dried at 80° C. and a few of 1-methy-2-pyrrolidinone (NMP) were added to get a syrup. The syrup was cold rolled into thick films and pieces of film with 1 $cm^2$ in size, were then hot-pressed at 80° C. under 100 MPa on a titanium plate.

Figure 1:
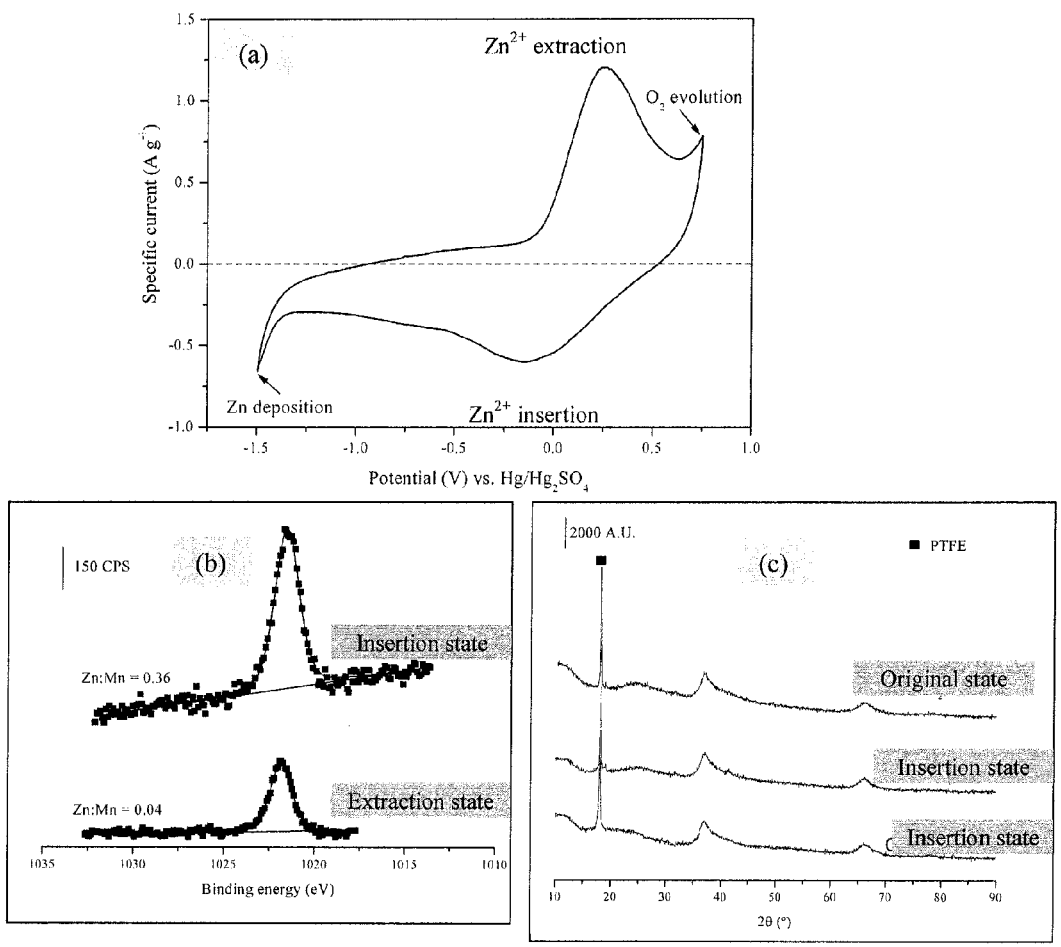
FIG. 1 a) Cyclic voltammogram of amorphous α-$MnO_2$ electrode in 0.1 mol $L^{-1}$ $ZnSO_4$ aqueous electrolyte (pH=5.2) at a sweep rate of 1 mV $s^{-1}$. b) Zn $2p_{3/2}$ core level spectra of amorphous α-$MnO_2$ electrodes at insertion and extraction states. c) X-ray diffraction patterns of amorphous α-$MnO_2$ electrodes at insertion and extraction states.

For the single amorphous α-$MnO_2$ electrode measurement, the three-electrodes assembly has been used, in which a large activated carbon electrode (2×2 $cm^2$) and Hg/$Hg_2SO_4$ (in saturated $K_2SO_4$) were assembled as the counter and reference electrode, respectively. A luggin capillary faced the working electrode at a distance of 2 mm was used to minimize errors due to iR drop in the electrolyte. FIG. 1a shows the cyclic voltammogram of amorphous α-$MnO_2$ electrode in 0.1 mol $L^{-1}$ $ZnSO_4$ aqueous electrolyte (pH=5.2) at a sweep rate of 1 mV $s^{-1}$. The potential was controlled from −1.5 to 0.75 V vs. Hg/$Hg_2SO_4$. Two distinguishable anodic and cathodic peaks were emerged around 0.0 V and −0.4 V during charge/discharge, respectively. We have performed X-ray photoelectron spectrum (XPS) and X-ray diffraction (XRD) analysis on cathodic amorphous α-$MnO_2$ electrodes at original (fresh), extraction (potentiostated at 0,0 V) and insertion (potentiostated at −0.4 V) states. Zn $2p_{3/2}$ core level spectra of α-$MnO_2$ electrodes at original, extraction and insertion states are shown in FIG. 1b. The augment of intensity of Zn 2p from extraction to insertion states clearly confirms the insertion/extraction of $Zn^{2+}$ ion into/from amorphous α-$MnO_2$. XRD patterns of amorphous α-$MnO_2$ electrode at original (fresh), insertion and extraction states are shown in FIG. 1c The sharp peak observed at 18° corresponds to the PTFE binder [A. Yuan, Q. Zhang, Electrochem. Commun., 8 (2006) 1176]. For the as-prepared amorphous α-$MnO_2$ electrode, only broad peaks around 2θ=37.0 and 65.3° are present, which indicates the samples present in a partially crystalline state and the profiles correspond to some peaks of α-$MnO_2$ (JCPDS NO. 44-0141), This sample is widely known as amorphous α-$MnO_2$, which is well accepted in $MnO_2$-based supercapacitor area. Compared the XRD pattern of the as-prepared $MnO_2$ electrode with those of the reduced and oxidized electrodes, no significant change was observed. Moreover, compared these patterns to powder diffraction files (PDF) of crystals, no evidence of MnOOH (No. 74-1842,74-1632, 74-1631), Mn(OH)$_2$ (73-1604, 73-1133), $Mn_3O_4$(80-0382, 75-1560) or $Mn_2O_3$ (78-0390, 76-0150) formation can be detected. These results indicate a single-phase zinc ion intercalation process. The same results were obtained as the intercalation of $Li^+$ ions into amorphous $MnO_2$ in the organic system [J. J. Xu, H. Ye, G. Jain, J. Yang, Electrochem. Commun., 6 (2004) 894].

Figure 2:
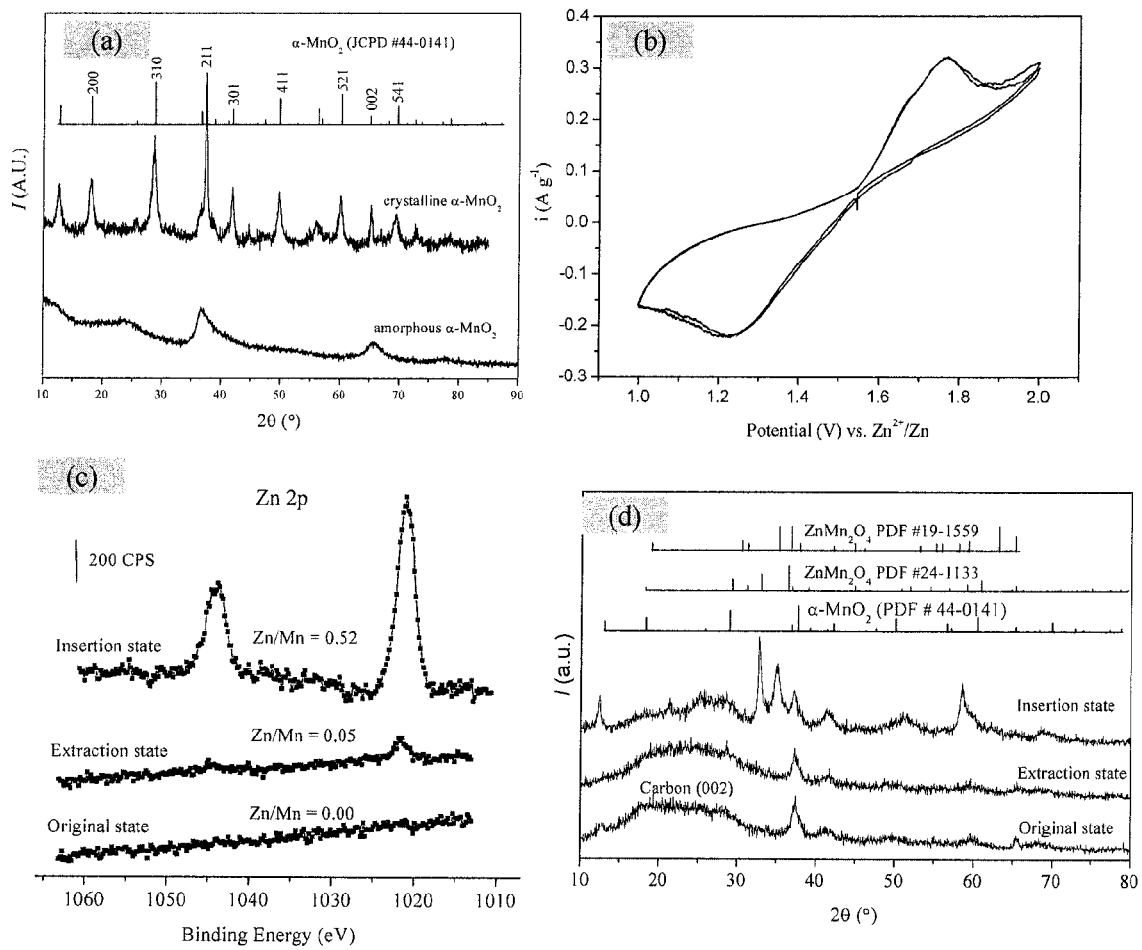
FIG. 2 a) X-ray diffraction patterns of amorphous α-$MnO_2$ and crystalline α-$MnO_2$. b) Cyclic voltammogram of crystalline α-$MnO_2$ electrode in 1 mol $L^{-1}$ $ZnSO_4$ aqueous electrolyte (pH=4.2) at a sweep rate of 0.5 mV $s^{-1}$. b) Zn 2p core level spectra of crystalline α-$MnO_2$ electrodes at insertion and extraction states. c) X-ray diffraction patterns of crystalline α-$MnO_2$ electrodes at original, insertion and extraction states.

Amorphous α-$MnO_2$ has been heat treated at 300° C. for 10 hours. The amorphous α-$MnO_2$ has turned to crystalline α-MnO$_2$. The XRD patterns of amorphous α-MnO$_2$ and crystalline α-MnO$_2$ are shown in FIG. 2a, FIG. b shows the cyclic voltammogram of crystalline α-MnO$_2$ electrode in 1 mol L$^{-1}$ ZnSO$_4$ aqueous electrolyte at a sweep rate of 0.5 mV s$^{-1}$. There are two distinguishable peaks emerged around 1.3 V and 1.7 V vs. Zn$^{2+}$/Zn during cycling, respectively. We have performed XPS and XRD analysis on crystalline MnO$_2$ electrodes at original (fresh), extraction (potentiostated at 1.7 V) and insertion (potentiostated at 1.3 V) states. Zn 2p core level spectra of crystalline α-MnO$_2$ electrodes at original, extraction and insertion states are shown in FIG. 2c. The augment of intensity of Zn 2p from extraction to insertion states clearly confirms the insertion/extraction of Zn$^{2+}$ ion into/from crystalline α-MnO$_2$. XRD patterns of crystalline α-MnO$_2$ electrodes at original, extraction and insertion states are shown in FIG. 2d. At insertion state, the formation of ZnMn$_2$O$_4$ clearly confirms the insertion of Zn$^{2+}$ ion into crystalline α-MnO$_2$, while at extraction state there is just crystalline α-MnO$_2$, which indicates the extraction of Zn$^{2+}$ ion. Therefore, the two distinguishable peaks emerged around 1.3 V (insertion state) and 1.7 V (extraction state) peaks have been confirmed to be storage/release of Zn$^{2+}$ ions into/out of crystalline α-MnO$_2$ tunnels.

Based on the XPS and XRD analysis, the redox couple ascribes to be the insertion-extraction of Zn$^{2+}$ ions in solid amorphous or crystalline α-MnO$_2$:

$$\delta Zn^{2+} + 2\delta e^- + \alpha\text{-}MnO_2 = Zn_\delta MnO_2 \quad (10)$$

This zinc ion intercalation process is totally different from the proton intercalation process of γ-MnO$_2$, which occurs in primary Zn/MnO$_2$ batteries or in RAM. The cyclic voltammogram, XRD and XPS results confirmed our novelty of our new battery, whose battery chemistry is quite different from that of primary Zn/MnO$_2$ batteries or RAM.

Figure 3:
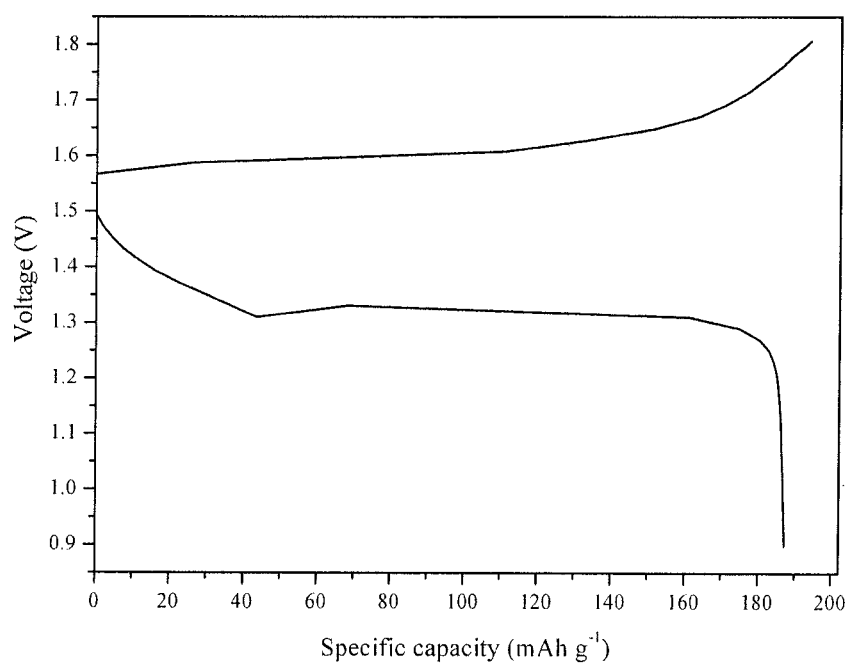
FIG. 3 The first discharge and charge curves of Cell 1 at a current density of 0.1 A $g^{-1}$ (based on the positive active mass).
Figure 4:
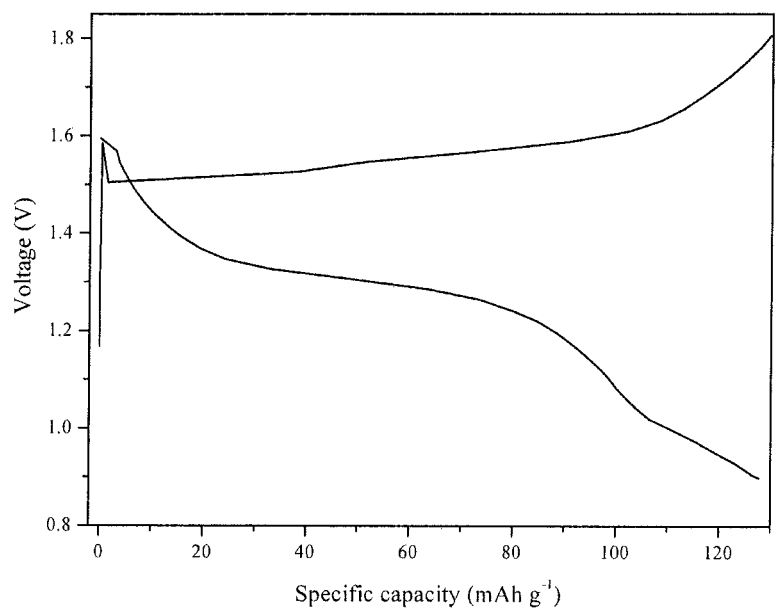
FIG. 4 The charge and discharge curves of Cell 1 at 1 A $g^{-1}$.
Figure 5:
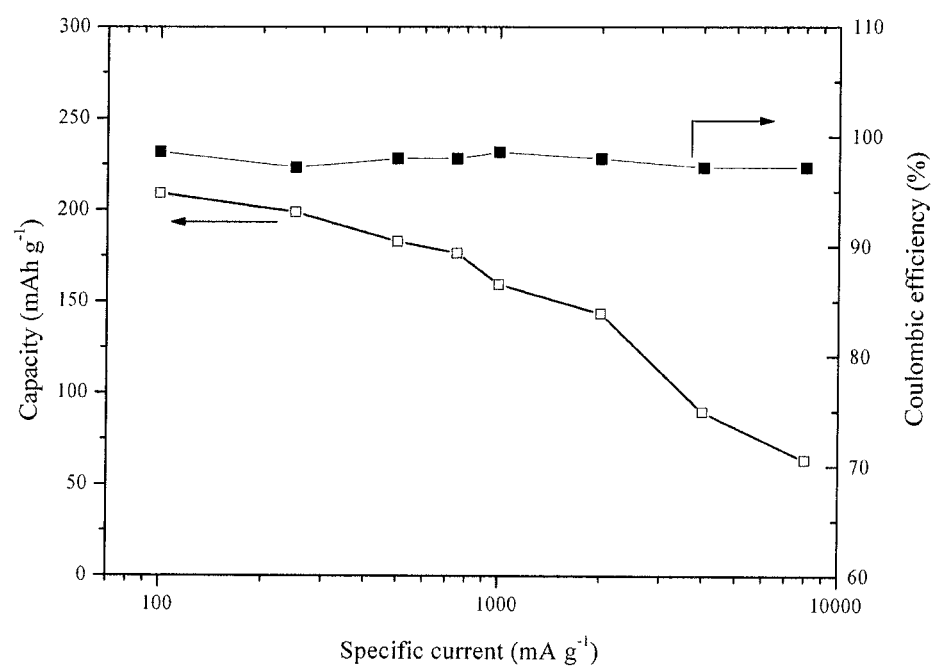
FIG. 5 Dependence of capacity and coulombic efficiency of Cell 1 on the current density.

The battery test used the coin cell assembly consisting of amorphous α-MnO$_2$ positive and zinc negative electrodes. A glass paper was used as the separator. The amorphous α-MnO$_2$ electrode is similar to the electrode used in FIG. 1. Zinc foil (0.1 mm in thickness) was used as anode. The electrolyte is 1 mol L$^{-1}$ ZnSO$_4$ solution (pH=4.2). This cell was denoted as Cell 1. The first discharge and charge curves are shown in FIG. 3 at a current density of 0.1 A g$^{-1}$ (based on the positive active mass). The charge and discharge curves of Cell 1 at 1 A g$^{-1}$ are shown in FIG. 4. FIG. 5 shows the dependence of capacity and coulombic efficiency of Cell 1 on the current density. Cell 1 shows good rate ability and good coulombic efficiency.

Figure 6:
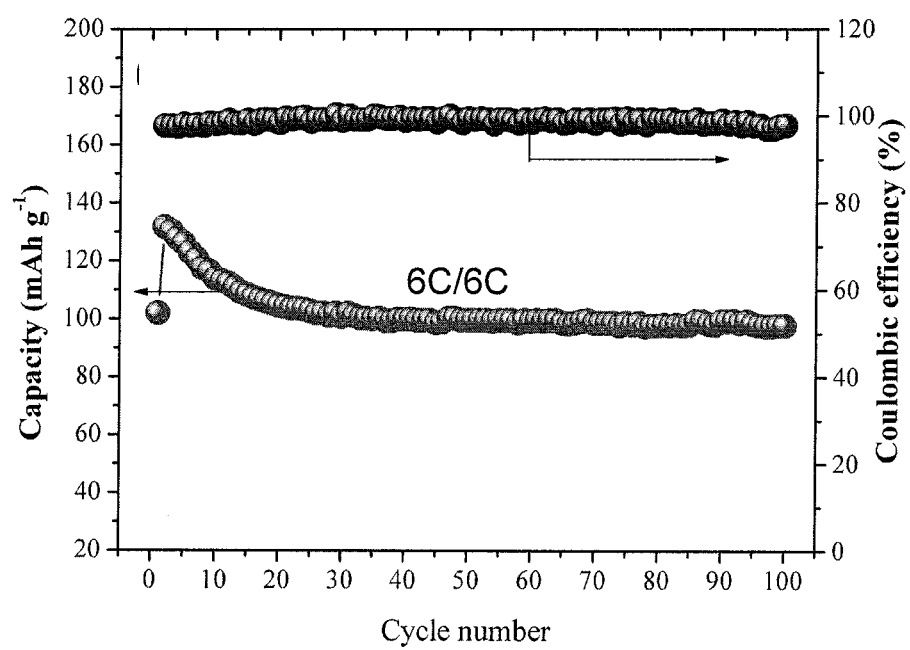
FIG. 6 The cycle performance of Cell 2 at 1 A $g^{-1}$ in terms of capacity retention and coulombic efficiency.

We also used 0.1 mol L$^{-1}$ ZnSO$_4$ solution (pH=5.0) as the electrolyte and named it as Cell 2. The configuration of Cell 2 is similar to Cell 1 except that the electrolyte is 0.1 mol L$^{-1}$ ZnSO$_4$ solution (pH=5.0) instead of 1 mol L$^{-1}$ ZnSO$_4$ solution (pH=4.2). The cycle life of Cell 2 at 1 A g$^{-1}$ is shown in FIG. 6 in terms of capacity retention and coulombic efficiency.

Figure 7:
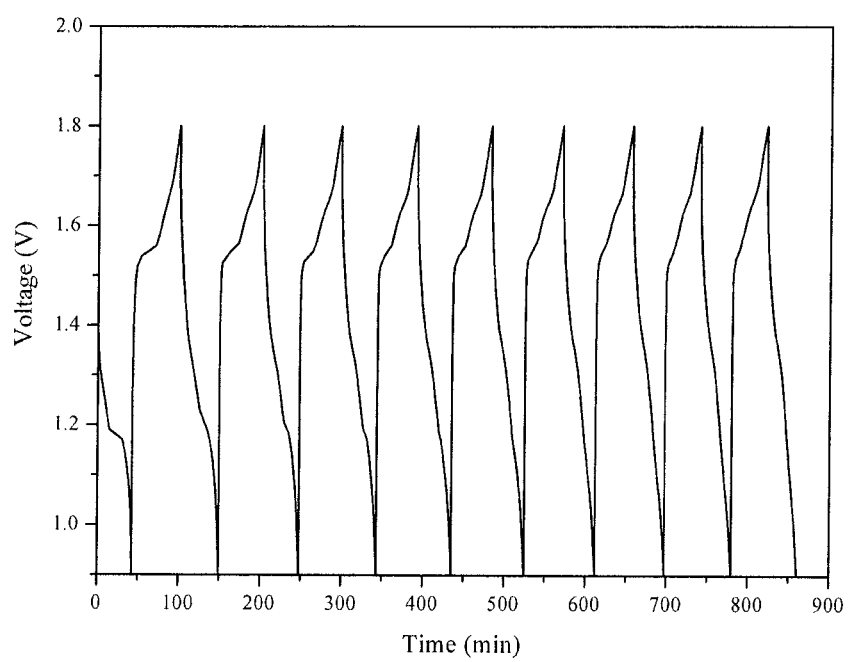
FIG. 7 The charge and discharge cycling of Cell 3 at 0.1 A $g^{-1}$.

We have adjust the pH value of 0.1 mol L$^{-1}$ ZnSO$_4$ solution (pH=5.0) to 6.2 by adding NaOH. And the battery using 0.1 mol L$^{-1}$ ZnSO$_4$ solution (pH=6.2) as the electrolyte is donated as Cell 3. The positive electrode of Cell 3 is made of 80% crystalline α-MnO$_2$ as active material with 20 wt % acetylene black and 10 wt % polytetrafluoroethylene (PTFE). The anode of Cell 3 is zinc foil (0.1 mm in thickness). The charge and discharge cycling of Cell 3 at 0.1 A g$^{-1}$ is shown in FIG. 7.

Figure 8:
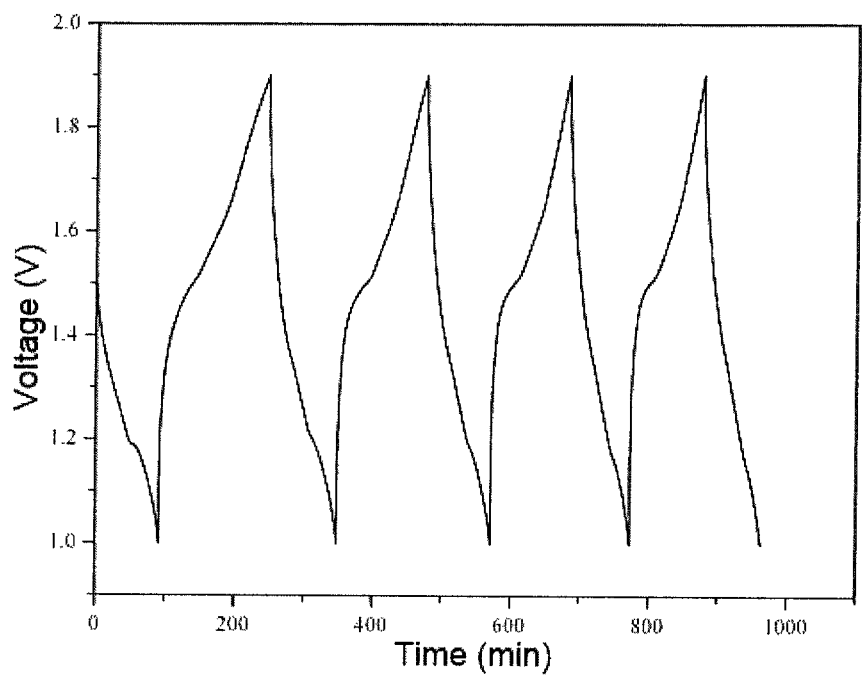
FIG. 8 The charge and discharge cycling of Cell 4 at 0.1 A $g^{-1}$.

The zinc powder was also considered to be used as anodic active material. 40% zinc powder, 50% carbon black and 10% PTFE were mixed and pressed on titanium foil as zinc electrode. This zinc electrode and above-mentioned manganese dioxide electrode were served as negative and positive electrodes, respectively. A glass paper was used as the separator. The electrolyte is 0.1 mol L$^{-1}$ ZnSO$_4$ solution (pH=5.0). This cell is donated as Cell 4. The charge and discharge cycling of Cell 4 at 0.1 A g$^{-1}$ is shown in FIG. 8.

What is claimed is:

1. A rechargeable zinc ion battery, comprising:
    a cathode composed of a compressed mixture of manganese dioxide particles, which can store and release zinc ions (Zn$^{2+}$ ions), electrical conductive particles and one or more binders;
    a zinc anode;
    a separator for separating said cathode from said anode; and
    an aqueous electrolyte containing zinc ions, in which pH value is controlled from 4 to 7,
    wherein the manganese dioxide particles of the cathode hosts and releases zinc ions in its structure lattice during charge and discharge.

2. The rechargeable cell as in claim 1, wherein said zinc anode is in any shapes of pure zinc or zinc alloys.

3. The rechargeable cell as in claim 1, wherein said zinc anode is composed of a compressed mixture of pure zinc and/or zinc alloy particles, electrically conductive particles and a binder.

4. The rechargeable cell as in claim 1, wherein said one or more binder(s) is selected from the group consisting of natural and synthetic rubbers, polysulfone, acrylic polymers, epoxy resins, polystyrene and polytetrafluoroethylene.

* * * * *